May 5, 1964  R. V. HENSLEY  3,131,535
ROCKET NOZZLE
Filed April 7, 1960
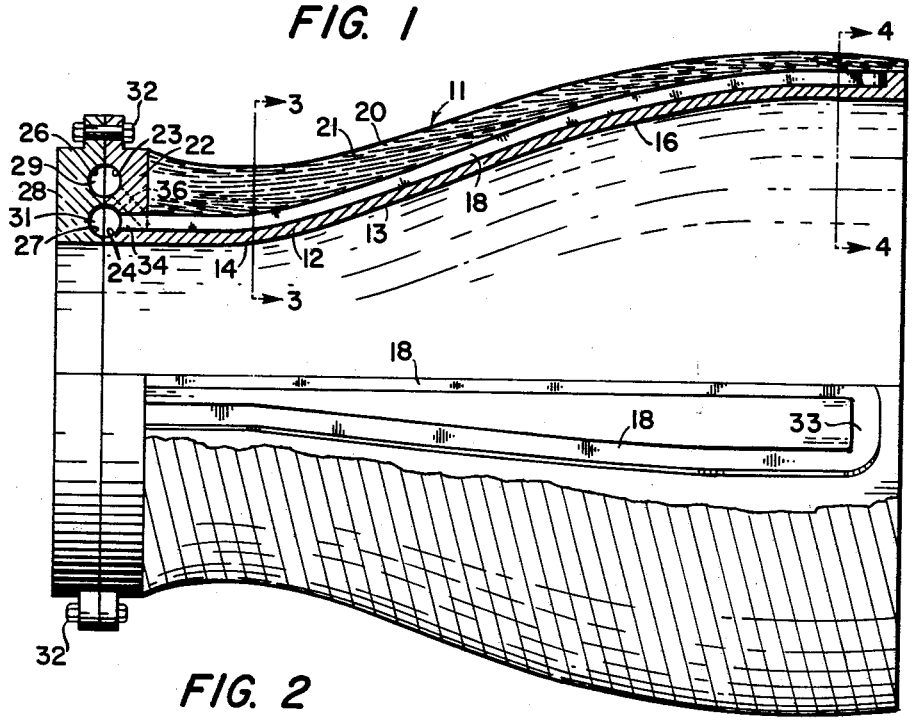
FIG. 1
FIG. 2
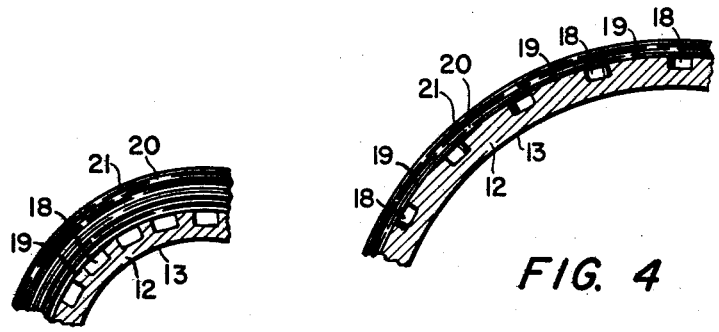
FIG. 3
FIG. 4
INVENTOR.
REECE V. HENSLEY
BY
ATTORNEY 3,131,535
ROCKET NOZZLE
Reece V. Hensley, Potomac, Md., assignor, by mesne assignments, to PneumoDynamics Corporation, Cleveland, Ohio, a corporation of Delaware
Filed Apr. 7, 1960, Ser. No. 20,718
5 Claims. (Cl. 60—35.6)

This invention relates generally to rocket nozzles and more particularly to a new and improved contoured rocket nozzle and the method of making the same.

It is an important object of this invention to provide a new and improved contoured rocket nozzle structure which can be easily manufactured.

Still another object of this invention is to provide a contoured rocket nozzle incorporating cooling passages through which cooling liquid flows.

It is still another object of this invention to provide a contoured rocket nozzle including a metal case wrapped with pre-stress ribbon material such as aluminum foil wherein the ribbon material is cemented in place by bonding material.

Further objects and advantages will appear from the following description and drawings wherein:

FIGURE 1 is a side elevation partially in section illustrating a typical rocket to which a nozzle incorporating this invention is suited;

FIGURE 2 is a side elevation partially in longitudinal section of a preferred embodiment of this invention illustrating the structural detail;

FIGURE 3 is a fragmentary section taken along 3—3 of FIGURE 2; and,

FIGURE 4 is a fragmentary view taken along 4—4 of FIGURE 2.

Because of the extreme temperature encountered in rocket nozzles, it is desirable to provide cooling means to protect the nozzle structure against excessive heat and erosion. This is particularly advantageous when the rocket is of the liquid propellant type since the liquid fuel can be used to cool a nozzle. This produces a dual advantage of providing protective cooling for the nozzle structure and in addition preheating the fuel so that more efficient combustion is achieved. The manufacture of such nozzle by the use of normal machining methods is extremely difficult since the cooling passages must be curved to follow the inner contour of the nozzle.

In a rocket nozzle, according to this invention, the cooling passages can be machined as open grooves on the outer surface of a nozzle shell so that they follow the contour of an inner nozzle surface. These grooves are then closed and isolated from each other by a wrapping comprising a large number of layers of ribbon like material such as aluminum foil cemented with a bonding material. This structure provides curved closed cooling passages which follow the nozzle contour and in addition pre-stress the nozzle to increase its strength.

FIGURE 1 illustrates a typical rocket 10 provided with a rocket nozzle 11 located at its rearward end. The nozzle 11 is mounted by any suitable means on the frame of the rocket. Since such a mounting is not part of this invention it has not been illustrated.

The structure of the nozzle 11 best illustrated in FIGURE 2 includes a shell member 12 formed with an inner surface 13 contoured to produce the desired nozzle characteristic. In the illustrated nozzle the inner surface 13 is provided with a convex portion 14 followed by a concave portion 16. The shell member is formed with a plurality of longitudinal grooves 18 which are milled in the outer surface thereof. These grooves 18 are separated by lands 19 best shown in FIGURES 3 and 4. The periphery or outer surface of the shell 12 is covered by a wrapping of layers of metallic foil ribbon 21. The ribbon material 21 engages the lands 19 and cooperates with the grooves 18 to form curved passages which extend longitudinally of the nozzle and follow the contour of the inner surface 13. The ribbon material 21 is preferably cemented at 20 with a high temperature bonding material such as a phenolic or an epoxy resin. The outer nozzle is manufactured by first machining the shell 12 and then wrapping it with strips of foil. The bonding material 20 is applied by first coating the lands 19 and thereafter coating the ribbon between each layer. The bonding material in cooperation with the metal ribbon material forms a rigid strong outer surface for the nozzle and also provides the necessary sealing between the ribbons and the lands 19 so that the grooves 18 are isolated from each other.

In order to increase the strength of the nozzle, the ribbon material is preferably placed in tension as it is wrapped around the shell 12 to pre-stress the shell 12 in compression. Also the total thickness of the windings of ribbon material 21 is increased in areas requiring additional strength. Because the nozzle is pre-stressed, a lighter weight structure can be provided for a given installation.

The shell 12 is preferably formed with an enlarged flange 22 at its forward end. A pair of annular grooves 23 and 24 are formed in the forward face of the flange 22 which cooperate with similar annular grooves 26 and 27 formed in a mating ring 28 to form annular manifold passages 29 and 31. The ring 28 is fastened to the flange 22 by bolt fasteners 32.

Preferably the grooves 18 are formed to extend longitudinally of the nozzle with adjacent grooves 18 connected at their rearward ends by a connecting passage 33. In the preferred structure there are a series of U shaped circuits or flow paths closed at their rearward ends. One leg of each flow path is connected to the manifold 31 by a passage 34 and the other leg of the flow path is connected to the manifold 29 through a passage 36. Liquid can therefore flow from the manifold 29 through each of the flow paths to rear end of the nozzle and then back to the manifold 31. The two manifolds 29 and 31 are connected to the fuel system of the rocket so that rocket fuel pumped into one manifold passes through the cooling passage and out the other manifold to the engine. The particular arrangement of these connections has not been shown since it is not critical to this invention.

It should be understood that the cross section of the grooves 18 can be varied along their length to produce the desired heat transfer characteristic. It should also be understood that the particular arrangement with U shaped flow paths is only illustrated as one structure of this invention and that other flow path arrangements and manifold arrangements could be utilized depending upon the particular design requirements of the nozzle. Because the nozzle material is adequately cooled it is possible to use such light weight material as aluminum to form the nozzle shell 12 and aluminum foil for the ribbon 21. It is also possible to form the cooling passages so that they extend substantially along the inner surface 13 on the nozzle.

Those skilled in the art will recognize that machining of such curved closed passages would be extremely difficult, if not impossible. Therefore, a nozzle according to this invention, has the advantage of ease of manufacture, low cost and light weight.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:
1. In a nozzle, a nozzle shell having an inner wall surface formed with a nozzle configuration, said shell having an outer wall surface formed with a plurality of adjacent grooves for circulating coolant fluid through the nozzle shell, said nozzle shell outer wall surface including integral lands between adjacent grooves disposed in the outer wall surface, the lateral width of said lands changing as they extend along said shell, communicating grooves formed in said outer wall surface of the nozzle shell for leading coolant fluid from some of said grooves to other adjacent grooves for return of coolant fluid, a cover for said nozzle shell comprising multiple layers of thin metallic ribbon material bonded to said lands and wound on said nozzle shell with the successive layers of ribbon material being bonded to each other to form a cover for the nozzle shell and closing said grooves to form closed passages in the nozzle shell for circulation of coolant fluid through the nozzle shell.

2. A nozzle comprising,
an elongate shell having a generally longitudinally extending substantially open and unobstructed passageway,
said shell having an outer surface provided with lands formed integral therewith to define a plurality of grooves therein,
said lands having portions thereof which vary in width as the lands extend along the shell,
certain of said grooves being spaced apart relative to each other and extending along the shell with other ones of said grooves connecting adjacent ones of the certain grooves, and
a covering for said shell,
said covering being disposed in engagement with the shell along the lands thereof and defining therewith fluid coolant conveying means for the nozzle.

3. A nozzle comprising,
an elongate shell having a generally longitudinally extending substantially open and unobstructed passageway,
said shell having an outer surface provided with lands formed integral therewith to define a plurality of grooves therein,
said lands having portions thereof which vary in width as the lands extend along the shell,
certain of said grooves being spaced apart relative to each other and extending along the shell with other ones of said grooves connecting adjacent ones of the certain grooves, and
a covering for said shell,
said covering varying in thickness between the end portions of the shell and disposed in engagement with the shell along the lands thereof to define therewith fluid coolant conveying means for the nozzle.

4. A nozzle comprising,
an elongate shell having a generally longitudinally extending substantially open and unobstructed passageway,
said shell having an outer surface provided with a plurality of lands formed integral therewith to define a plurality of grooves therein,
said lands having portions thereof which vary in lateral width as the lands extend along the shell,
certain of said grooves being spaced apart and extending generally longitudinally along the shell with other ones of said grooves extending generally laterally relative thereto and connecting adjacent ones of the certain grooves, and
a covering for said shell,
said covering comprising a plurality of layers of material disposed in engagement with the shell along the lands thereof and defining therewith fluid coolant conveying means for the nozzle.

5. A nozzle comprising,
an elongate shell having a generally longitudinally extending substantially open and unobstructed passageway,
said shell having an outer surface provided with a plurality of laterally spaced apart generally longitudinally extending lands formed integral therewith to define a plurality of grooves therein,
said lands having portions thereof which vary in lateral width as the lands extend along the shell,
certain of said grooves being laterally spaced apart relative to each other and extending generally longitudinally relative to the shell with other ones of said grooves extending generally laterally relative to the shell and connecting adjacent ones of the certain grooves, and
a covering for said shell,
said covering varying in thickness between the end portions of the shell and comprising a plurality of layers of metallic ribbon material disposed in engagement with the shell along the lands thereof and defining therewith fluid coolant conveying means for the nozzle.

References Cited in the file of this patent
UNITED STATES PATENTS

| | | |
|---|---|---|
| 2,600,630 | Fergusson | June 17, 1952 |
| 2,743,514 | Duecy | May 1, 1956 |
| 2,744,043 | Ramberg | May 1, 1956 |
| 2,817,484 | Stenzel | Dec. 24, 1957 |
| 2,844,939 | Schultz | July 29, 1958 |
| 2,880,577 | Halford et al. | Apr. 7, 1959 |
| 2,933,888 | Africano et al. | Apr. 26, 1960 |
| 2,943,442 | Baehr | July 5, 1960 |
| 2,955,415 | Long | Oct. 11, 1960 |
| 2,977,754 | Bell | Apr. 4, 1961 |

FOREIGN PATENTS

| | | |
|---|---|---|
| 1,112,030 | France | Nov. 9, 1955 |